US010230223B2

(12) United States Patent
Kemp (10) Patent No.: US 10,230,223 B2
(45) Date of Patent: Mar. 12, 2019

(54) SWING ARM ASSEMBLY FOR A UTILITY VAULT HOUSING A UTILITY EQUIPMENT (71) Applicant: Hubbell Incorporated, Shelton, CT (US)

(72) Inventor: Timothy Michael Kemp, Columbia, MO (US)

(73) Assignee: Hubbell Incorporated, Shelton, CT (US)

( * ) Notice: Subject to any disclaimer, the term of this patent is extended or adjusted under 35 U.S.C. 154(b) by 0 days.

(21) Appl. No.: 15/172,622

(22) Filed: Jun. 3, 2016

(65) Prior Publication Data
US 2017/0353019 A1 Dec. 7, 2017

(51) Int. Cl.
| A47B 96/06 | (2006.01) |
| H02G 3/02 | (2006.01) |
| F16M 13/02 | (2006.01) |
| H02G 3/10 | (2006.01) |
| H02G 7/00 | (2006.01) |

(52) U.S. Cl.
CPC ............. *H02G 3/02* (2013.01); *F16M 13/02* (2013.01); *H02G 3/10* (2013.01); *F16M 2200/024* (2013.01); *H02G 7/00* (2013.01)

(58) Field of Classification Search
USPC ................. 248/213.2; 385/134–137
See application file for complete search history.

(56) References Cited

U.S. PATENT DOCUMENTS

| 5,189,723 A * | 2/1993 | Johnson | G02B 6/4451 385/134 |
| 5,950,368 A * | 9/1999 | Bradford | E02D 29/1418 220/484 |
| 6,316,728 B1 * | 11/2001 | Hoover | H04Q 1/021 16/2.1 |
| 7,330,625 B2 * | 2/2008 | Barth | E02D 29/02 385/134 |
| 7,333,320 B2 * | 2/2008 | Standish | G02B 6/4451 174/37 |
| 8,250,957 B2 * | 8/2012 | Holmes | B23D 45/067 83/477.2 |
| 8,847,070 B2 * | 9/2014 | Burke | G02B 6/4451 174/37 |
| 8,873,924 B2 * | 10/2014 | Wei | G02B 6/4401 385/135 |
| 9,612,415 B2 * | 4/2017 | Adams | G02B 6/4442 |
| 2009/0175588 A1 * | 7/2009 | Brandt | G02B 6/4451 385/139 |
| 2015/0104142 A1 | 4/2015 | Adams | |

* cited by examiner

*Primary Examiner* — Monica E Millner
(74) *Attorney, Agent, or Firm* — Wissing Miller LLP (57) ABSTRACT

A swing arm assembly for a utility vault housing a utility equipment includes a swing arm bracket for supporting the utility equipment and a latch support arm both rotatably coupled to a sidewall of the utility vault. A latch pin is attached to one of the swing arm bracket and the latch support arm and a locking slot is formed in the other one of the swing arm bracket and the latch support arm for slidably receiving the latch pin. The locking slot has a first locking end that locks the latch pin in a stowed position for stowing the utility equipment and a second locking end that locks the latch pin in a service position for servicing the utility equipment.

18 Claims, 12 Drawing Sheets

SWING ARM ASSEMBLY FOR A UTILITY VAULT HOUSING A UTILITY EQUIPMENT

TECHNICAL FIELD

The present invention relates to swing arm assemblies for a utility vault, and in particular swing arm assemblies for supporting and servicing a utility equipment housed in a utility vault.

BACKGROUND OF THE INVENTION

Utility equipment such as telecommunications cables are run completely or partially underground from a utility station to a neighborhood and then on to individual homes. For example, telecommunications cables may include optical fibers or copper cables that are run underground in a neighborhood. At certain junctions, such as a junction leading to a neighborhood or subscriber home, those cables may enter a utility vault. In certain situations, the utility equipment of the vault may include a junction box or wiring enclosure having incoming and outgoing cables with some slack cables inside the vault.

Such a vault may be fully buried, partially buried or fully exposed above the ground such as on cement, gravel, earth or other foundation at a level which is low relative to a standing or seated position of a technician who would like to work on the utility equipment of the vault. The low position of the vault makes it very inconvenient for the technicians to work on the equipment.

It has recently been proposed for the utility equipment to be mounted on a swing arm assembly used for swinging the enclosure up and out of the vault. Unfortunately, conventional prior art swing arm assemblies have proven to be expensive, bulky, and difficult to assemble and use.

Therefore, it would be desirable to provide an improved swing arm assembly that overcomes or alleviates one or more of the aforementioned and other deleterious characteristics of prior art assemblies.

SUMMARY OF THE DISCLOSURE

In one aspect of the present invention, a swing arm assembly for a utility vault housing a utility equipment includes a swing arm bracket for supporting the utility equipment and a latch support arm both rotatably coupled to a sidewall of the utility vault. A latch pin is attached to one of the swing arm bracket and the latch support arm and a locking slot is formed in the other one of the swing arm bracket and the latch support arm for slidably receiving the latch pin. The locking slot has a first locking end that locks the latch pin in a stowed position for stowing the utility equipment and a second locking end that locks the latch pin in a service position for servicing the utility equipment.

In another aspect of the invention, an elongate vertical support is slidably couple to a sidewall of the utility vault. The swing arm bracket supporting the utility equipment and the latch support arm are both rotatably attached to the vertical support so as to allow the utility equipment to slide up to a raised position for servicing the equipment at a comfortable height for a technician.

DETAILED DESCRIPTION OF THE INVENTION

Briefly, the embodiments disclosed herein illustrate a system and method of using a swing arm assembly for quick access to underground utility equipment such as electrical or telecommunications equipment housed in a utility vault. Advantageously, the swing arm assembly of the present invention allows a technician to rotate or swing the utility equipment out of the vault from a stowed position to a service position and raise it to a raised position while remaining safely away from an open underground vault to provide a safe working height for the technician.

The locking mechanisms of the present swing arm assembly provide automatic locking at the stowed position, service position, lowered position and raised position to allow all operations without bolting or tying as were necessary with conventional swing arm assemblies.

Because the utility vault is typically installed below ground, there is a possibility that it can be flooded with water. If that were to occur, the utility equipment in the vault can act as a float and become buoyant. The buoyant equipment can press against the cover of the vault and potentially cause the vault to burst. Advantageously, the automatic locking mechanism of the present swing arm assembly prevents the utility equipment from rising, thereby reducing the risk of the vault from bursting.

The present swing arm assembly is also designed to mount near the grade surface/top of an inground vault to reduce excavation of existing enclosures for installation. Moreover, the locking mechanisms of the present invention allows the rotation between stowed position and service position, and sliding between lowered position and raised position in any order.

Figure 1A:
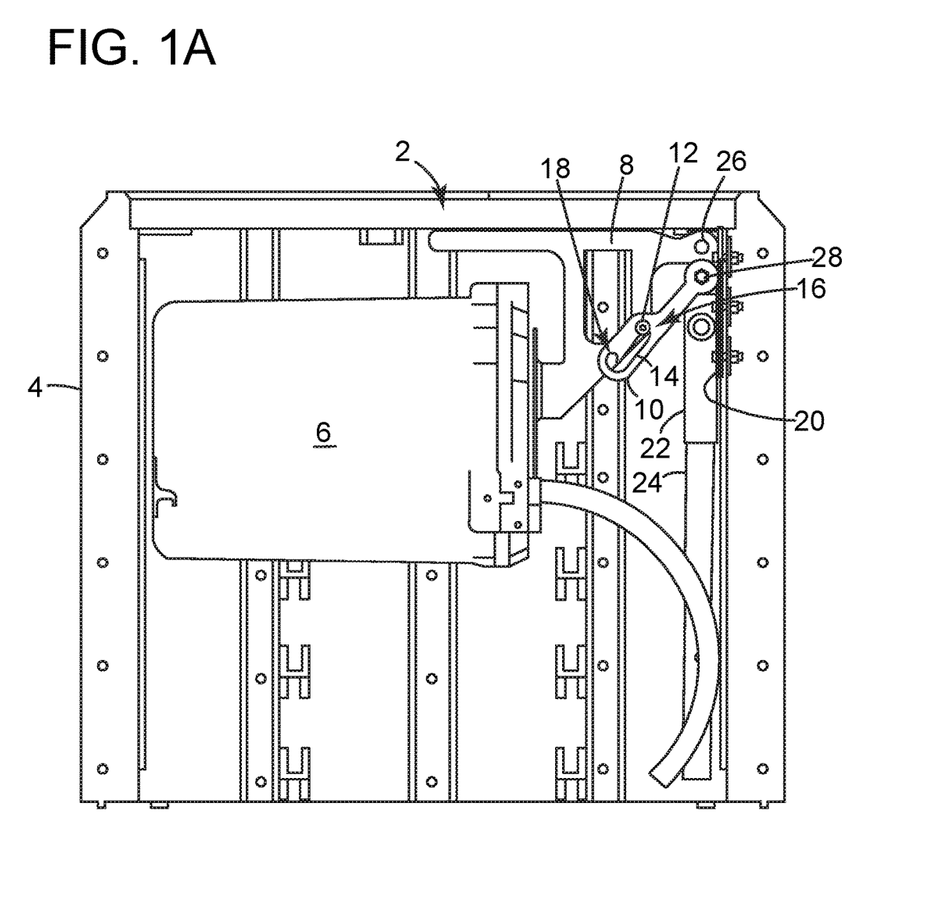
FIG. 1A is a side view of a swing arm assembly in a stowed position inside a utility vault according to one aspect of the present invention.
Figure 1B:
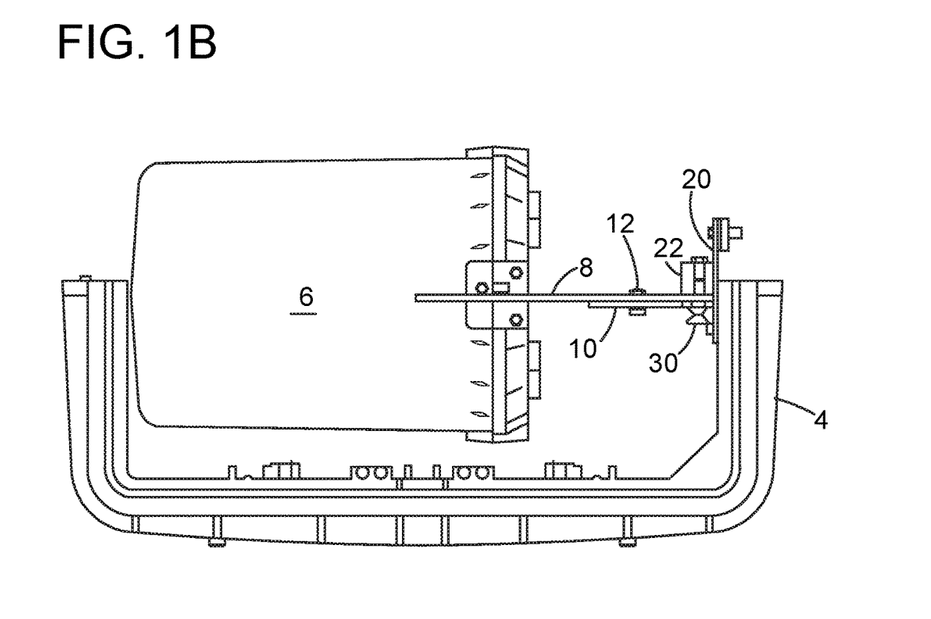
FIG. 1B is a plan view of the swing arm assembly of FIG. 1A.
Figure 2A:
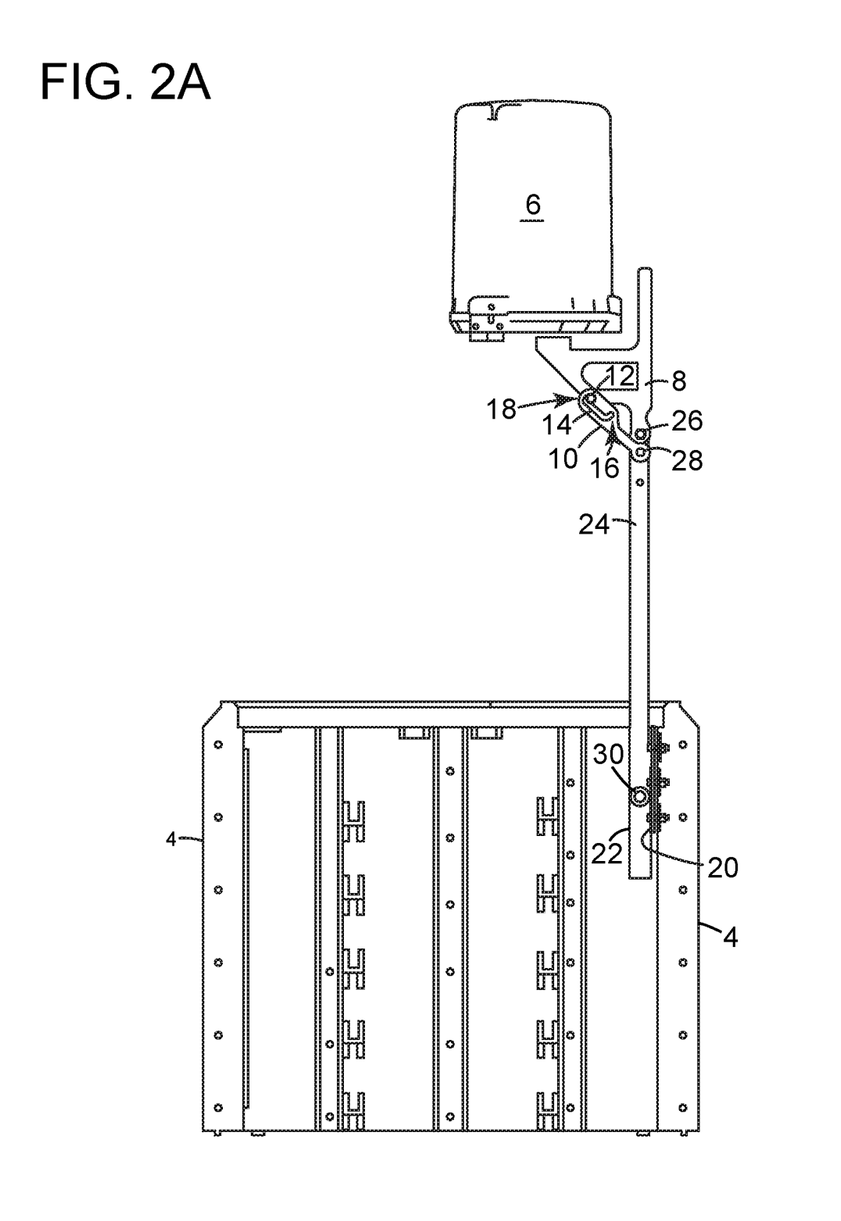
FIG. 2A is a side view of a swing arm assembly in a raised service position according to one aspect of the present invention.
Figure 2B:
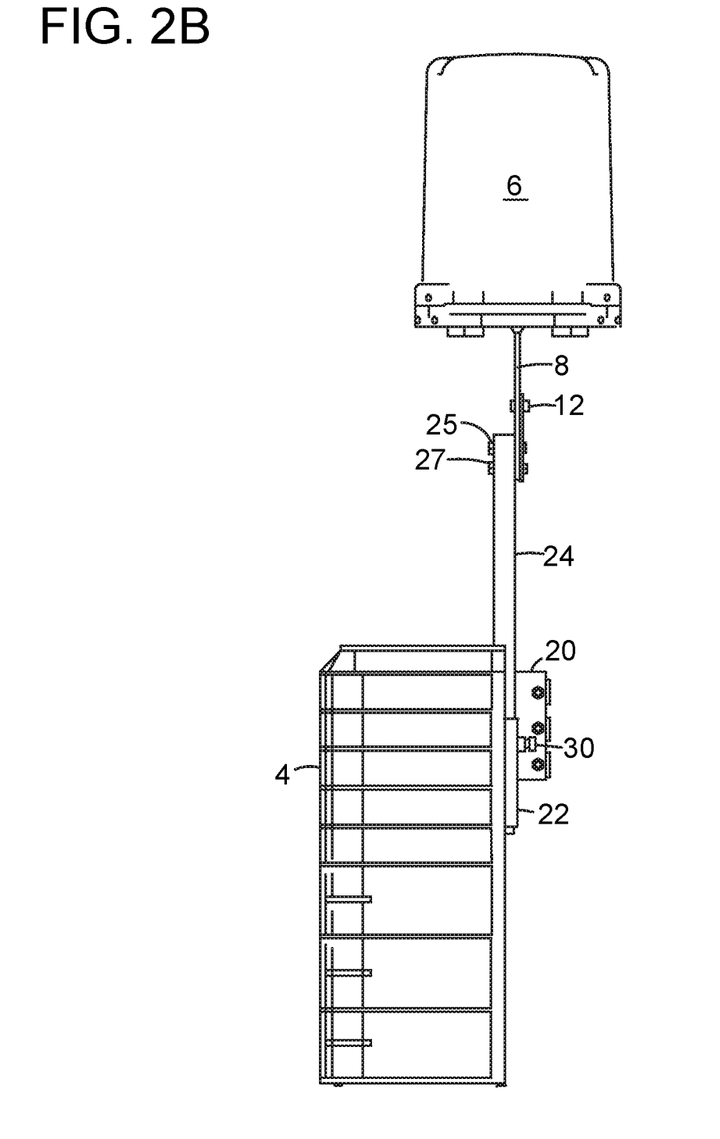
FIG. 2B is a front view of the swing arm assembly of FIG. 2A.
Figure 3:
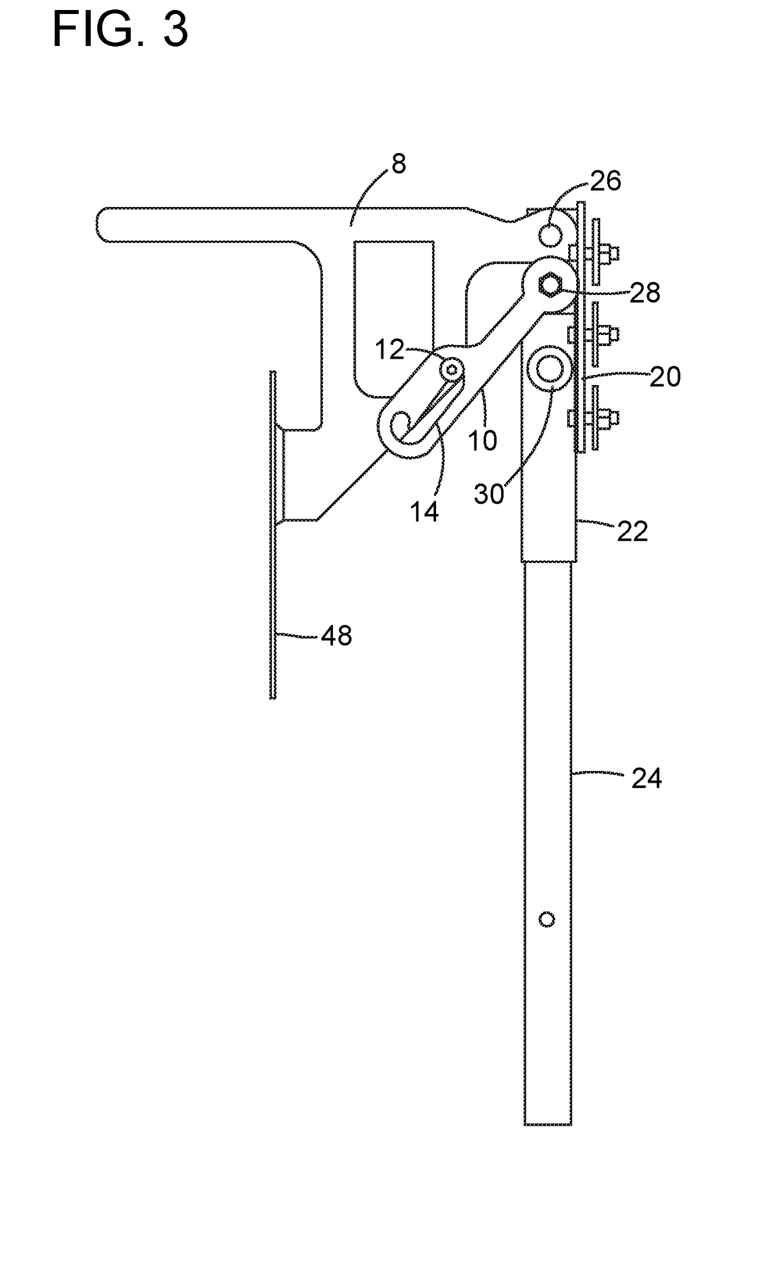
FIG. 3 is a side view of the swing arm assembly of FIG. 1A without a utility equipment.

FIGS. 1A and 1B illustrate a swing arm assembly 2 in a stowed position inside a utility vault 4 according to one aspect of the present invention. FIGS. 2A and 2B illustrate the swing arm assembly 2 in a raised service position according to one aspect of the present invention. Referring to FIGS. 1A-2B, a swing arm assembly 2 for a utility vault 4 housing a utility equipment 6 includes a swing arm bracket 8 for supporting the utility equipment, latch support arm 10, mounting bracket 20, a guide tube 22 and elongate vertical support 24 such as an elongate tube.

The utility equipment 6 is mounted to and is supported by the swing arm bracket 8. The swing arm bracket 8 is rotatably coupled to a sidewall of the utility vault 4 by a pin 25 (see FIG. 2B) through a swing arm bracket pivot point 26 on the elongate vertical support 24. The latch support arm 10 is also rotatably coupled to the sidewall of the utility vault 4 by a pin 27 (see FIG. 2B) through a support arm pivot point 28 on the elongate vertical support 24. The pivot point 28 is positioned slightly lower than the pivot point 26. Each of the pins 25,27 can include, for example, a combination of a shoulder bolt or screw, one or more washers and a locking nut.

A latch pin 12 is attached to the swing arm bracket 8. One exemplary latching pin 12 may be a combination of a shoulder bolt and a locking nut. An elongate slot 14 formed in the latch support arm 10 slidably receives the latch pin 12. The elongate slot 14 has a proximal locking end 16 adapted to lock the latch pin 12 in a stowed position to stow the utility equipment 6 below a top surface of the utility vault 4. A distal locking end 18 at the other end of the elongate slot 14 is adapted to lock the latch pin 12 in a service position for servicing the utility equipment 6.

The terms "proximal" and "distal" are used in relation to the pivot point 28 at the elongate vertical support 24 of the swing arm assembly 2. Thus, the distal locking end 18 is further away from the mounting bracket 20 than the proximal locking end 16 from the pivot point 28.

Figure 4:
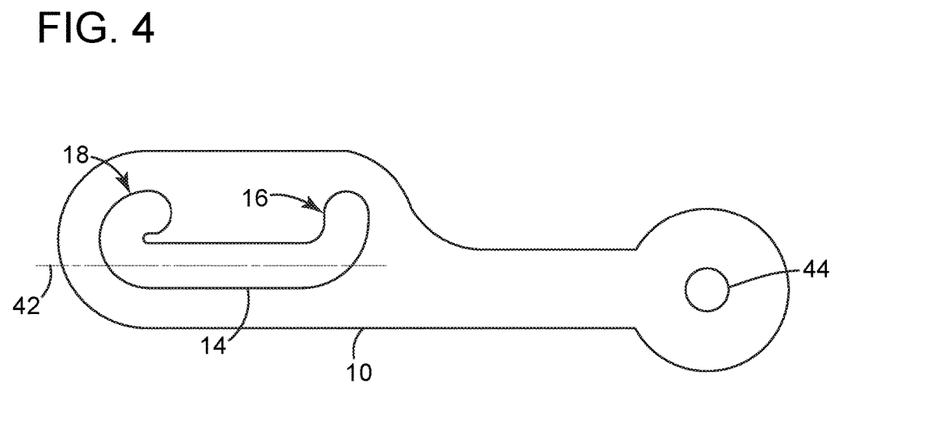
FIG. 4 illustrates a latch support arm of the swing arm assembly of FIG. 1A.

As more clearly shown in FIG. 4, the proximal locking end 16 of the latch support arm 10 extends laterally from a longitudinal axis 42 of the elongate slot 14. The distal locking end 18 extends laterally from the longitudinal axis 42 of the elongate slot 14 and then further extends proximally toward the proximal locking end 16 to form a U-shaped locking end.

The latch pin 12 can be unlocked from either the proximal locking end 16 or the distal locking end 18 by lifting the latch support arm 10 upward to move the pin away from the lateral locking end and toward the longitudinal axis 42 of the slot 14.

Locking of the latch pin 12 in either the proximal locking end 16 or the distal locking end 18 is done automatically by gravity due to the shape of the elongate slot 14. When the utility equipment 6 is rotationally lowered from the service position to the stowed position, the latch pin 12 slides proximally from the distal locking end 18 toward the proximal locking end 16 along the longitudinal axis of the elongate slot 14 and then moves laterally into the proximal locking end to automatically lock the utility equipment 6 into the stowed position.

Conversely, when the utility equipment 6 is rotated upward out of the stowed position to the service position, the latch pin 12 slides distally from the proximal locking end 16 toward the distal locking end 18 along the longitudinal axis 42 of the elongate slot 14 and then moves laterally into the U-shaped distal locking end to automatically lock the utility equipment into the service position.

As shown in FIGS. 2A and 2B, the utility equipment 6 can be raised from a lowered position to a raised position for ease of servicing the equipment by a technician, which will be more fully explained with reference to FIGS. 6 and 7 later herein.

Figure 5A:
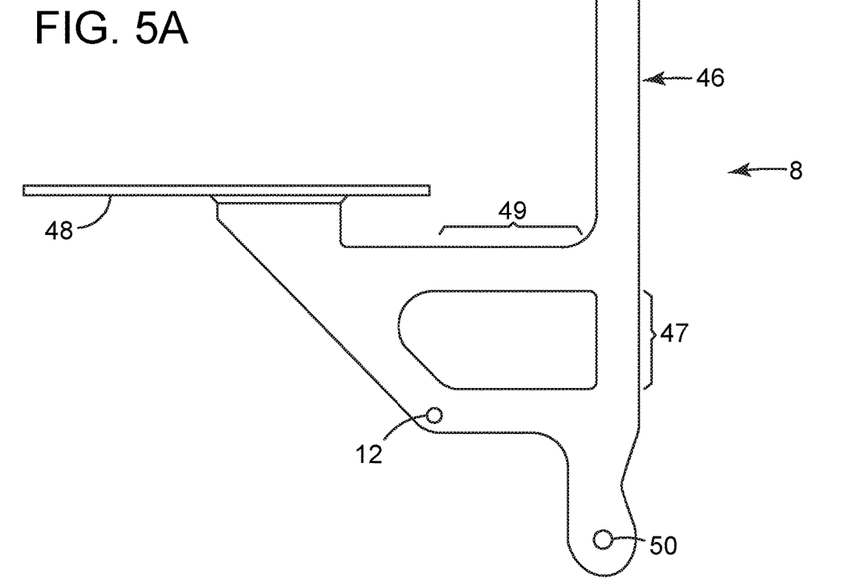
FIG. 5A is a side view of a swing arm bracket of the swing arm assembly of FIG. 1A for supporting a utility equipment.
Figure 5B:
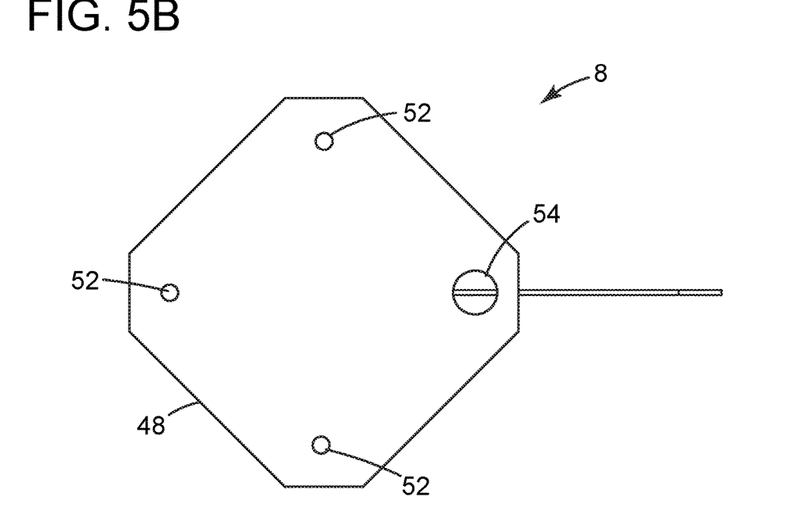
FIG. 5B is a plan view of the swing arm bracket of FIG. 5A.

FIG. 5A is a side view of a swing arm bracket 8 of the swing arm assembly 2 of FIG. 1A for supporting a utility equipment 6 while FIG. 5B is a plan view of the swing arm bracket of FIG. 5A.

The swing arm bracket 8 is rotatably coupled to the vertical support 24 by a pin 25 (see FIG. 2B) inserted through a hole 50 at pivot point 26. A mounting plate 48 supports and mounts the utility equipment 6 to the mounting bracket 20 using three screws through holes 52. A cable hole 54 is provided for cables exiting from the utility equipment 6 housing a set of electrical wires and/or fibers.

The swing arm bracket 8 includes two vertical handles 46,47 extending vertically from the bracket hole 50 and one horizontal handle 49 that extends laterally and horizontally relative to the handle 46. The handle 46 can be used to change the position of the utility equipment 6 between the stowed position and service position. The smaller vertical handle 47 can be used to change the position of the utility equipment 6 between the lowered position and raised position when the equipment is in the stowed position. The horizontal handle 49 can be used to change the position of the utility equipment 6 between the lowered position and raised position when the equipment is in the service position. Advantageously, the three handles 46,47,49 of the swing arm bracket 8 allow the technician to change the position of the equipment in a simple effortless manner.

Figure 6:
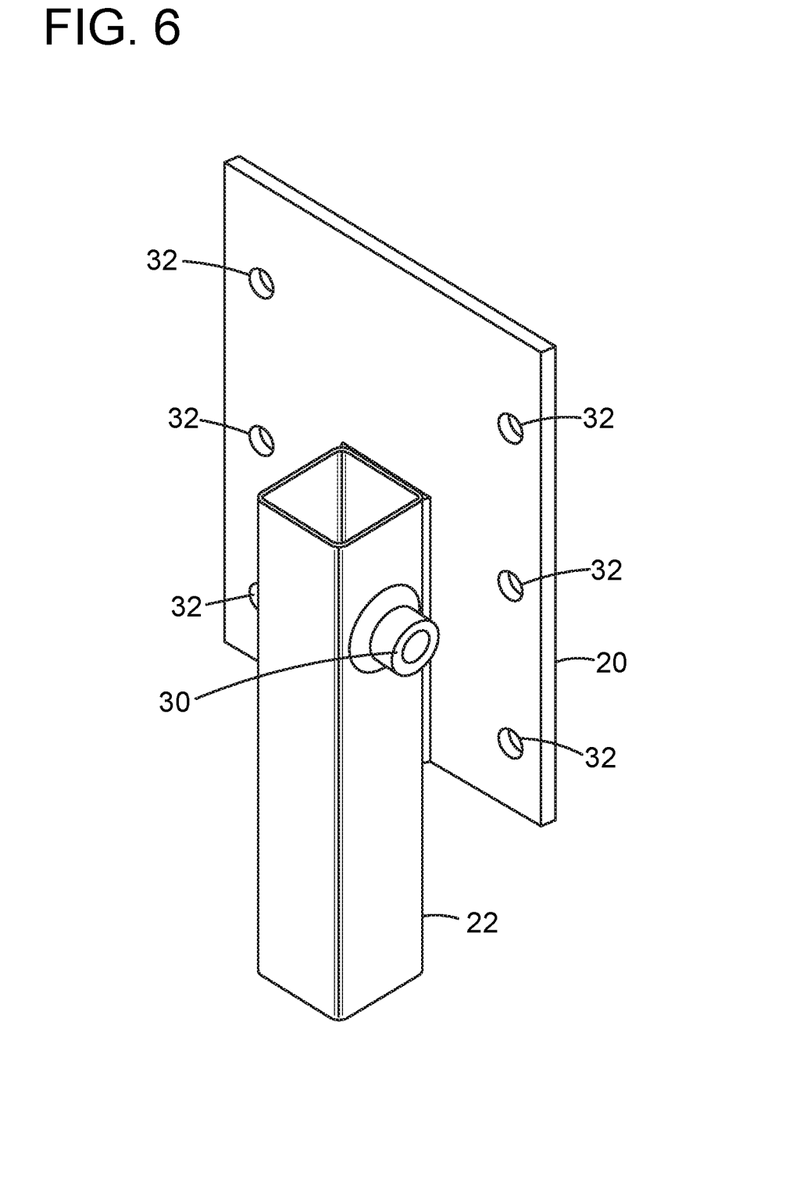
FIG. 6 is a perspective view of a mounting bracket and guide tube of the swing arm assembly of FIG. 1A.
Figure 7:
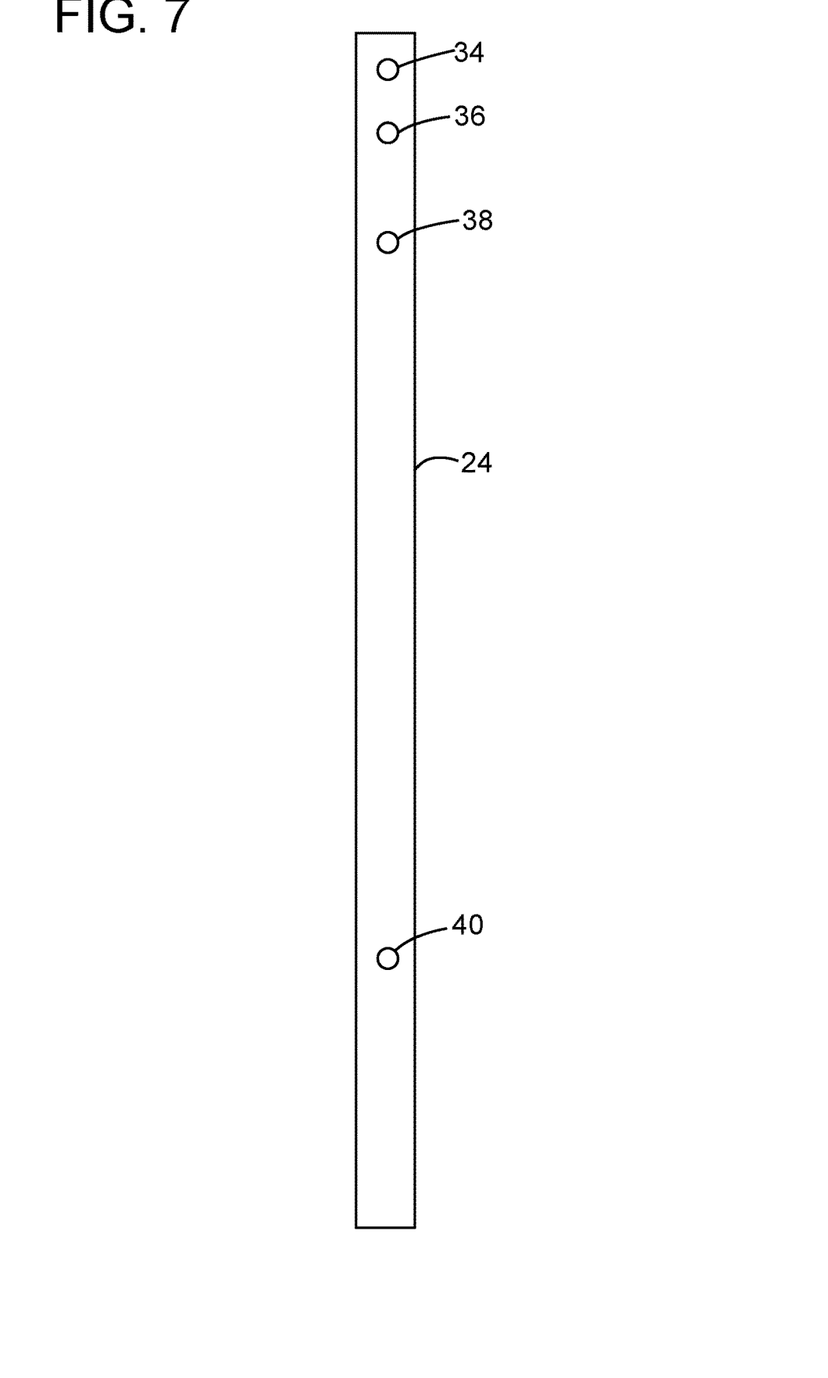
FIG. 7 illustrates a vertical support of the swing arm assembly of FIG. 1A.

FIG. 6 is a perspective view of a mounting bracket 20 and guide tube 22 of the swing arm assembly 2 of FIG. 1A while FIG. 7 illustrates a vertical support 24 of the swing arm assembly of FIG. 1A.

The mounting bracket 20 is attached, for example by welding, to the guide tube 22 that slidably receives the vertical support 24. Six mounting holes 32 of the mounting bracket 20 receive respective mounting screws (or bolt and nut combination) that are screwed into the side wall of the vault 4. The mounting bracket 20 is mounted in an upper portion of the side wall to allow the vertical support 24 to slide down toward a bottom portion of the side wall to place the utility equipment 6 in the lowered position.

As shown in more detail in FIG. 7, the vertical support 24 has four holes. A bracket pivot hole 34 receives a pin 25 to rotatably couple the swing arm bracket 8 to the side wall of the vault 4 through the vertical support 24. A support arm pivot hole 36 receives a pin 27 to rotatably couple the latch support arm 10 to the side wall of the vault 4 through the vertical support 24.

Upper hole 38 and lower hole 40 are sized to receive a pin such as the plunger 30 attached to the guide tube 22. The plunger 30 is preferably a spring loaded plunger 114 which is biased to engage into the holes 38,40 of the vertical support 24 to automatically lock the vertical support 24 in the lowered and raised position as the vertical supports slides up or down, respectively. This configuration prevents the user from raising the utility equipment 6 to an even higher position including preventing the user from lifting the vertical support 24 above and off the guide tube 22. This configuration also prevents the buoyant utility equipment 6 from pressing against the cover of the vault 4 and potentially causing the vault to burst.

Advantageously, the swing arm bracket 10 locking mechanism 12,14 and vertical support 24 locking mechanism 30,38,40 operate together to position the utility equipment 6 in any of the four positions: lowered and stowed position, raised and stowed position, lowered and service position, and raised and service position. Moreover, the same mechanisms allow the present swing arm assembly to move the utility equipment 6 independently between lowered position and raised position, and between stowed position and service position in any sequence.

Figure 8A:
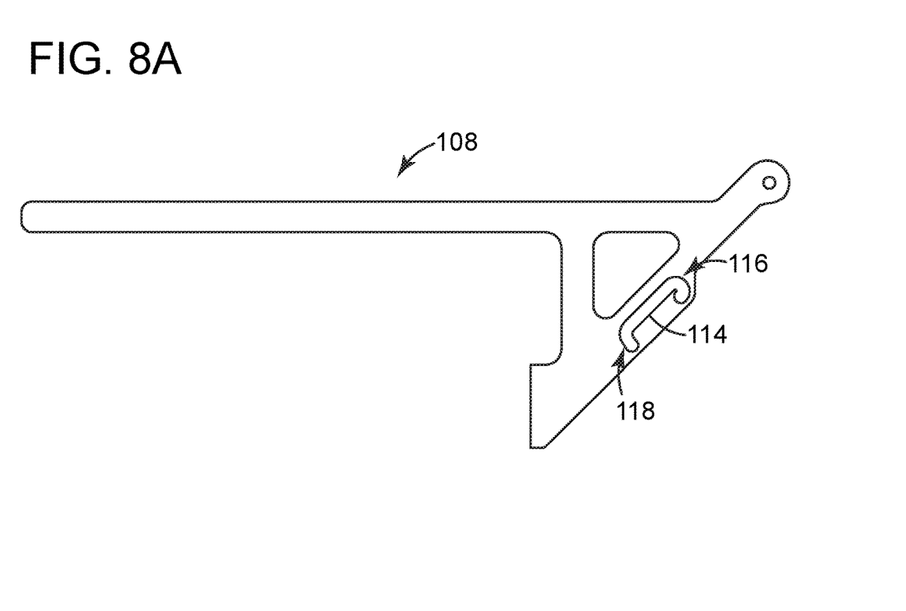
FIG. 8A illustrates an alternative embodiment of a swing arm bracket of the swing arm assembly of FIG. 1A for supporting a utility equipment.
Figure 8B:
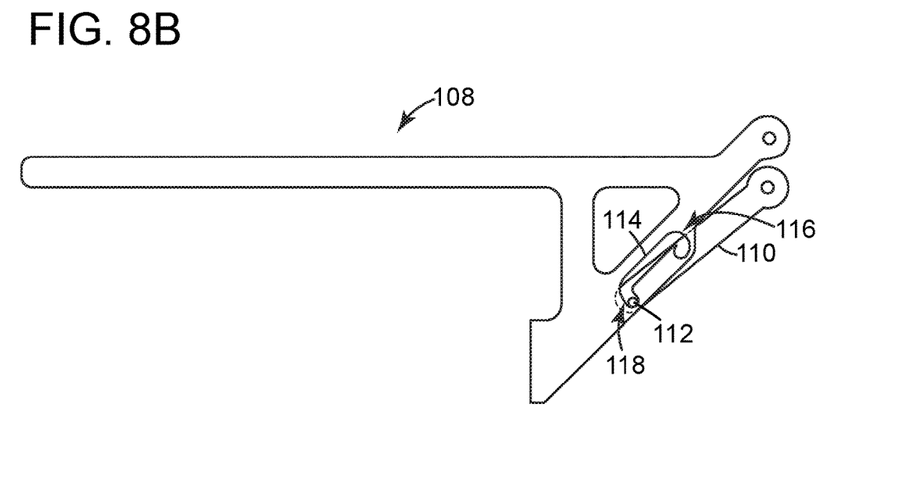
FIG. 8B illustrates an alternative embodiment of a swing arm bracket and latch support arm of the swing arm assembly of FIG. 1A.

FIGS. 8A-8B illustrate an alternative embodiment of a swing arm bracket and latch support arm of the swing arm assembly of FIG. 1A.

In this embodiment, the latch pin 112 is attached to a latch support arm 110 while an elongate slot 114 is formed on a swing arm bracket 108. The elongate slot 114 slidably receives the latch pin 112. The elongate slot 114 has a distal locking end 118 adapted to automatically lock the latch pin 112 in a stowed position by gravity to stow the utility equipment 6 below a top surface of the utility vault 4. A proximal locking end 116 at the other end of the elongate slot 114 is adapted to automatically lock the latch pin 112 in a service position by gravity for servicing the utility equipment 6.

For FIG. 8B, the terms "proximal" and "distal" are used in relation to the pivot point 26 at the elongate vertical support 24 of the swing arm assembly 2. Thus, the distal locking end 118 is further away from the mounting bracket 20 than the proximal locking end 116 from the pivot point 26.

The distal locking end 118 of the latch support arm 10 extends laterally from a longitudinal axis of the elongate slot 114. The proximal locking end 116 extends laterally from the longitudinal axis of the elongate slot 114 and then further extends distally toward the distal locking end 118 to form a U-shaped locking end.

The locking ends 116,118 of FIG. 8A laterally extend from the longitudinal axis of the elongate slot 114 in a generally downward direction which is the opposite of the upward direction to which the locking ends 16,18 of FIG. 4 extend.

Similar to the latch support arm 10 of FIG. 1A, the latch pin 112 can also be unlocked from either the proximal locking end 116 or the distal locking end 118 by lifting the latch support arm 110 upward to move the pin 112 away from the lateral locking end and toward the longitudinal axis of the slot 14.

Figure 9:
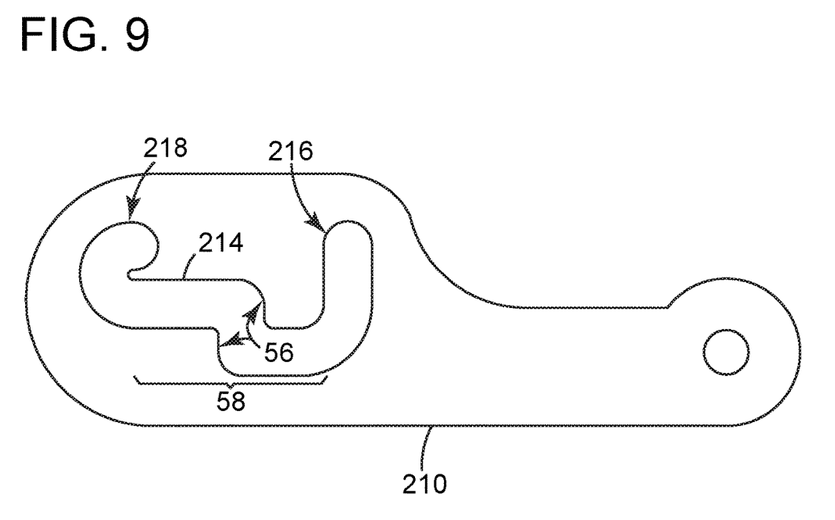
FIG. 9 illustrates an alternative embodiment of a latch support arm according to another aspect of the present invention.

FIG. 9 illustrates an alternative embodiment of a latch support arm according to another aspect of the present invention. A latch support arm 210 of FIG. 9 has an elongate slot 214 having an intermediate portion 58, a distal locking end 218 and proximal locking end 216. In operation and structure, the latch support arm 210 of FIG. 9 is similar to the latch support arm 10 of FIG. 4, except that the intermediate portion 58 has a laterally bending portion 56.

The bending portion 56 breaks the rotating movement of the utility equipment 6 about the pivot point 26 to provide a safety stop so as to prevent the equipment from applying an excessive and potentially damaging force to either the proximal locking end 216 or the distal locking end 218 through the pin.

Figure 10A:
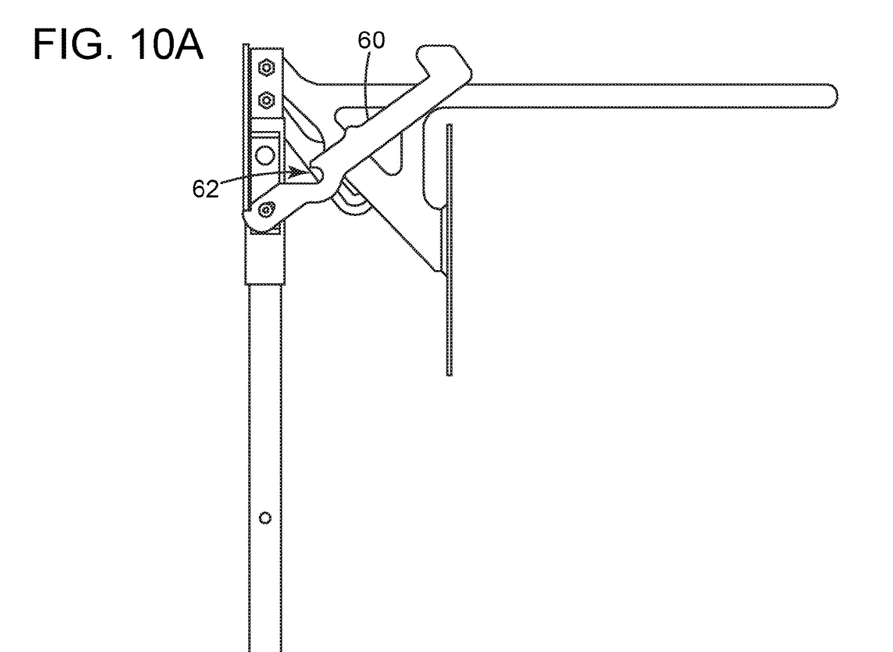
FIGS. 10A and 10B illustrate a plunger lever according to one aspect of the present invention.
Figure 10B:
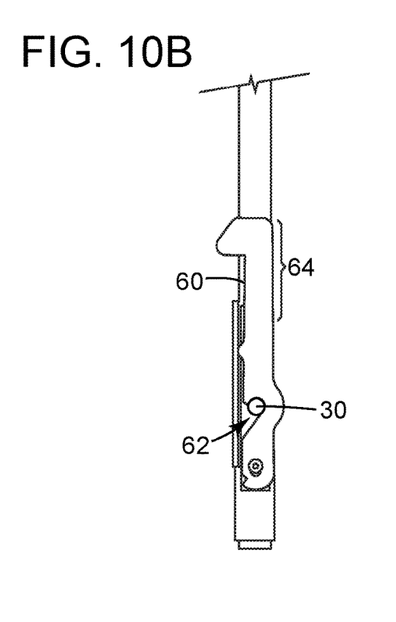

FIGS. 10A and 10B illustrate a plunger lever 60 according to one aspect of the present invention. Rather than pull the plunger 30 by hand to unlock it from the vertical support 24, the plunger lever 60 can be used to do so. This can be particularly useful when the plunger 30 is located below ground at a place that is difficult to reach by hand.

The plunger lever 60 is rotatably attached to the guide tube 22 at a point below the plunger 30 and has a recessed slot 62 which is designed to receive and engage with the plunger 30. A lever handle 64 of the plunger lever 60 is used to rotate the lever toward the guide tube 22 in a counterclockwise direction to engage the slot 62 with the plunger 30 as shown in FIG. 10B. When the plunger lever 60 is rotated away from the guide tube 22 in a clockwise direction to a lowered position as shown in FIG. 10A, the lever handle 64 can be positioned below the top end of the guide tube 22 to allow the technician to close the cover of the vault 4.

When the plunger lever 60 is engaged with the plunger 30, a technician can unlock the plunger from the respective hole 38 or 40 of the vertical support 24 by moving the handle 64 laterally away from the guide tube 22. Since the plunger 30 is biased towards the vertical support 24, the vertical support is automatically locked to either the lowered position or raised position as the support is being raised or lowered.

The foregoing specific embodiments represent just some of the ways of practicing the present invention. Many other embodiments are possible within the spirit of the invention. Accordingly, the scope of the invention is not limited to the foregoing specification, but instead is given by the appended claims along with their full range of equivalents.

What is claimed is:

1. A swing arm assembly for a utility vault housing a utility equipment comprising:
   a swing arm bracket for supporting the utility equipment, the swing arm bracket rotatably coupled to a sidewall of the utility vault;
   a latch support arm rotatably coupled to the sidewall of the utility vault;
   a latch pin attached to one of the swing arm bracket and the latch support arm;
   a locking slot formed in the other one of the swing arm bracket and the latch support arm for slidably receiving the latch pin, the locking slot having:
      a first locking end adapted to lock the latch pin in a stowed position for stowing the utility equipment; and
      a second locking end adapted to lock the latch pin in a service position for servicing the utility equipment;
      wherein one of the first and second locking ends extends laterally from a longitudinal axis of the locking slot and then further extends in a direction of the longitudinal axis.

2. The swing arm assembly of claim 1, wherein each of the first and second locking ends extends laterally from a longitudinal axis of the locking slot.

3. The swing arm assembly of claim 1, wherein the latch pin is attached to the swing arm bracket and the locking slot slidably receiving the pin is formed in the latch support arm.

4. The swing arm assembly of claim 1, wherein the latch pin is attached to the latch support arm and the locking slot slidably receiving the pin is formed in the swing arm bracket.

5. The swing arm assembly of claim 1, wherein the locking slot includes a bending portion interposed between the first and second locking ends adapted to break the sliding motion of the latch pin between the stowed position and the service position.

6. The swing arm assembly of claim 3, wherein the swing arm bracket includes:
   a mounting plate for mounting the utility equipment; and
   a handle disposed substantially perpendicularly to the mounting plate.

7. The swing arm assembly of claim 1, further comprising an elongate vertical support slidably coupled to the utility vault, wherein the swing arm bracket and the latch support arm are rotatably attached to the vertical support.

8. The swing arm assembly of claim 7, further comprising:

a mounting bracket attachable to the sidewall of the utility vault; and a guide tube attached to the mounting bracket and slidably coupled to the vertical support.

9. The swing arm assembly of claim 8, wherein the guide tube:

slidably receives the vertical support; and includes a plunger biased to automatically lock the vertical support in a raised position and in a lowered position.

10. The swing arm assembly of claim 9, further comprising a plunger lever attached to the guide tube and adapted to move the plunger to unlock the vertical support from the guide tube.

11. A swing arm assembly for a utility vault housing a utility equipment comprising:

a swing arm bracket for supporting the utility equipment, the swing arm bracket rotatably coupled to a sidewall of the utility vault;

a latch pin attached to the swing arm bracket;

a latch support arm rotatably coupled to the sidewall of the utility vault and having a self-locking locking slot for slidably receiving the latch pin, the locking slot having:

a proximal locking end adapted to automatically lock the latch pin in a stowed position for stowing the utility equipment; and a distal locking end adapted to automatically lock the latch pin in a service position for servicing the utility equipment.

12. The swing arm assembly of claim 11, wherein each of the proximal and distal locking ends extends laterally from a longitudinal axis of the locking slot.

13. The swing arm assembly of claim 11, wherein the distal locking end extends laterally from a longitudinal axis of the locking slot and then further extends proximally toward the proximal end to form a U-shaped distal locking end.

14. The swing arm assembly of claim 11, wherein the swing arm bracket includes:

a mounting plate for mounting the utility equipment; and a handle disposed substantially perpendicularly to the mounting plate for rotating the utility equipment between the stowed position and the service position.

15. The swing arm assembly of claim 11, further comprising an elongate vertical tube slidably coupled to the sidewall of the utility vault, wherein the swing arm bracket and the latch support arm are rotatably attached to the vertical tube.

16. The swing arm assembly of claim 15, further comprising:

a mounting bracket attachable to the inner wall of the utility vault; and a guide tube attached to the mounting bracket and adapted to slidably receive the vertical tube.

17. The swing arm assembly of claim 16, wherein the guide tube includes a plunger biased to automatically lock the vertical support in a raised position for servicing the utility equipment and in a lowered position for storage of the utility equipment.

18. A swing arm assembly for a utility vault housing a utility equipment comprising:

an elongate vertical tube slidably coupled to a sidewall of the utility vault and having a higher hole and a lower hole;

a swing arm bracket for supporting the utility equipment, the swing arm bracket rotatably coupled to the vertical tube for rotational movement between a stowed position and a service position;

a latch pin attached to the swing arm bracket;

a latch support arm rotatably coupled to the vertical tube and having a self-locking slot for slidably receiving the latch pin, the slot having:

a proximal locking end adapted to automatically lock the latch pin in the stowed position for stowing the utility equipment; and a distal locking end adapted to automatically lock the latch pin in the service position for servicing the utility equipment; and a plunger biased to be inserted into the higher hole to lock the utility equipment in a lowered position and into the lower hole to lock the utility equipment in a raised position.

* * * * *